US009550558B1

(12) United States Patent
Mathe et al.

(10) Patent No.: US 9,550,558 B1
(45) Date of Patent: Jan. 24, 2017

(54) OPTIMAL ALTITUDE CONTROLLER FOR SUPER PRESSURE AEROSTATIC BALLOON

(71) Applicant: Google Inc., Mountain View, CA (US)

(72) Inventors: Johan Mathe, Mountain View, CA (US); C. O. Lee Boyce, Jr., Mountain View, CA (US); Keith Allen Bonawitz, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/088,372

(22) Filed: Apr. 1, 2016

Related U.S. Application Data

(63) Continuation of application No. 13/899,363, filed on May 21, 2013, now Pat. No. 9,327,816.

(51) Int. Cl.
*B64B 1/44* (2006.01)
*G05D 1/04* (2006.01)

(52) U.S. Cl.
CPC ............... *B64B 1/44* (2013.01); *G05D 1/042* (2013.01)

(58) Field of Classification Search
CPC ............. G05D 1/042; B64B 1/44; B64B 1/64; A63H 2027/1033; A63H 2027/1083
See application file for complete search history.

(56) References Cited

U.S. PATENT DOCUMENTS

| | | | | |
|---|---|---|---|---|
| 5,645,248 A * | 7/1997 | Campbell | ................. | B64B 1/00 244/125 |
| 6,811,115 B2 * | 11/2004 | Kurose | ..................... | B64B 1/70 244/128 |
| 7,203,491 B2 * | 4/2007 | Knoblach | ................. | B64B 1/40 455/431 |
| 7,356,390 B2 * | 4/2008 | Knoblach | ................. | B64B 1/40 244/31 |
| 7,469,857 B2 * | 12/2008 | Voss | .......................... | B64B 1/60 244/96 |
| 8,065,046 B2 * | 11/2011 | Bandyopadhyay | ...... | B63G 8/14 440/1 |
| 8,814,084 B2 * | 8/2014 | Shenhar | .................. | A63H 27/10 244/128 |
| 2008/0135678 A1 * | 6/2008 | Heaven | ..................... | B64B 1/60 244/30 |
| 2012/0235410 A1 * | 9/2012 | Serrano | ..................... | B64B 1/50 290/50 |

\* cited by examiner

*Primary Examiner* — Philip J Bonzell
*Assistant Examiner* — Michael Kreiner
(74) *Attorney, Agent, or Firm* — McDonnell Boehnen Hulbert and Berghoff LLP

(57) ABSTRACT

This disclosure relates to the use of an optimal altitude controller for super pressure aerostatic balloon in connection with a balloon network. The aerostatic balloon includes a bladder containing a gas that is lighter than the air present in the environment of the balloon. Additionally, the aerostatic balloon includes an envelope filled with air. A mass-changing unit configured to selectively add or remove air may control the amount of air in the envelope. Further, the balloon has a communication module configured to transmit data relating to a current balloon state, and receives data relating to a desired balloon state. Additionally, the balloon includes a processor configured to control the mass-changing unit based on the desired balloon state. The mass-changing unit of the aerostatic balloon may be powered by a renewable energy source, such as solar power. The mass-changing unit adds or removes air with an impeller.

20 Claims, 8 Drawing Sheets

OPTIMAL ALTITUDE CONTROLLER FOR SUPER PRESSURE AEROSTATIC BALLOON

CROSS REFERENCE TO RELATED APPLICATION

The present application claims priority to U.S. patent application Ser. No. 13/899,363, filed on May 21, 2013, the entire contents of which is herein incorporated by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

In one aspect, the present disclosure features a method for adjusting a variable-buoyancy vehicle state. The method includes determining a target variable-buoyancy vehicle state for a variable-buoyancy vehicle. The target variable-buoyancy vehicle state includes at least one of a target mass, a target altitude and a target velocity. Additionally, the method includes determining a current variable-buoyancy vehicle state for the variable-buoyancy vehicle. The current variable-buoyancy vehicle state includes a current mass, a current altitude and a current velocity. The method also involves performing a state-change optimization to determine a fill-rate control plan to move the variable-buoyancy vehicle from the current variable-buoyancy vehicle state to the target variable-buoyancy vehicle state. The fill-rate control plan may have a plurality of fill rates for a bladder of the variable-buoyancy vehicle and timing information indicating when each fill rate should be utilized by the variable-buoyancy vehicle. Further, the method includes communicating the fill-rate control plan to the variable-buoyancy vehicle.

In some examples, the variable-buoyancy vehicle state also includes a global location. Additionally, in various examples, the fill-rate control plan further comprises communicating instructions for changing the variable-buoyancy vehicle state. The instructions for changing the variable-buoyancy vehicle state comprise instructions for operating an impeller. The energy used to operate the impeller may be provided by renewable energy. And in some embodiments, the method of claim 1, wherein the communicating is performed wirelessly.

They method may also include determining a revised variable-buoyancy vehicle state for the variable-buoyancy vehicle. The revised variable-buoyancy vehicle state includes a revised mass, a revised altitude and a revised velocity. The revised variable-buoyancy vehicle state may be used by the method to perform a revised state-change optimization to determine a revised fill-rate control plan to move the variable-buoyancy vehicle from the revised variable-buoyancy vehicle state to the target variable-buoyancy vehicle state. The revised fill-rate control plan may include a plurality of fill rates for a bladder of the variable-buoyancy vehicle and timing information indicating when the variable-buoyancy vehicle should utilize each fill rate. And the method also includes communicating the revised fill-rate control plan to the variable-buoyancy vehicle. In some embodiments, the state-change optimization is performed based on a calculation including at least one of adding ambient air to or removing ambient air from the variable-buoyancy vehicle, where the adding ambient air to or removing ambient air adjusts the mass.

In another aspect, the present disclosure features an aerostatic balloon. The aerostatic balloon has an envelope configured to hold air and a bladder located within the envelope. The bladder is configured to hold lift gas. The aerostatic balloon also has a control unit configured to add or remove air from the envelope in order to change a mass of air in the envelope. And the aerostatic balloon also has a processing unit. The processing unit is configured to determine a current balloon state for the balloon, where the current balloon state includes a current mass, a current altitude and a current velocity. The processing unit is also configured to perform a state-change optimization to determine a fill-rate control plan to move the balloon from the current balloon state to a target balloon state. The fill-rate control plan includes a plurality of fill rates for an envelope of the balloon and timing information indicating when the balloon should utilize each fill rate. Additionally, the control unit is further configured to adjust the mass of air in the envelope based on the fill-rate control plan.

In some examples, the aerostatic balloon may include a communication module configured to transmit data indicative of a current balloon state to the processing unit located at central control system. The communication module may also be configured to subsequently receive the fill-rate control plan that indicates at least one intermediate balloon state and a final balloon state. The control unit may be powered by a renewable energy source, such as solar power. Additionally, the communication module may be configured to communicate wirelessly. The communication module may be further configured to transmit data relating to a current balloon state at periodic intervals. Each balloon state may include an altitude, a system mass, and a vertical velocity for the balloon. In some embodiments, the current balloon state may also include a global location for the balloon. The processing unit of the aerostatic balloon may be further configured to determine both the at least one intermediate balloon state and the final balloon state. The aerostatic balloon may also include an impeller configured to change the mass of the aerostatic balloon by adding or removing ambient air from the balloon. Additionally, the processing unit may be configured to operate the control unit in one of a power-efficient mode, a time-efficient mode, and a damped-controlled mode.

In another aspect, the present disclosure features an article of manufacture including a non-transitory computer-readable medium having stored thereon program instructions that, if executed by a processor in a balloon-control system, cause the balloon-control system to perform operations. The operations include determining a target variable-buoyancy vehicle state for a variable-buoyancy vehicle. The target variable-buoyancy vehicle state includes at least one of a target mass, a target altitude and a target velocity. Additionally, the operations include determining a current variable-buoyancy vehicle state for the variable-buoyancy vehicle. The current variable-buoyancy vehicle state includes a current mass, a current altitude and a current velocity. The operations also involve performing a state-change optimization to determine a fill-rate control plan to move the variable-buoyancy vehicle from the current variable-buoyancy vehicle state to the target variable-buoyancy vehicle state. The fill-rate control plan may have a plurality of fill rates for a bladder of the variable-buoyancy vehicle and timing information indicating when the variable-buoyancy vehicle should utilize each fill rate. Further, the operations include communicating the fill-rate control plan to the variable-buoyancy vehicle.

In some examples, the operations may include the balloon state having an associated global location. Additionally, communicating the fill-rate control plan may include communicating instructions for changing the balloon state. In some embodiments, the communication may be performed wirelessly. Operations may also include instructions for changing the balloon state, such as instructions for operating an impeller powered by renewable energy.

DETAILED DESCRIPTION

I. Overview

Figure 1:
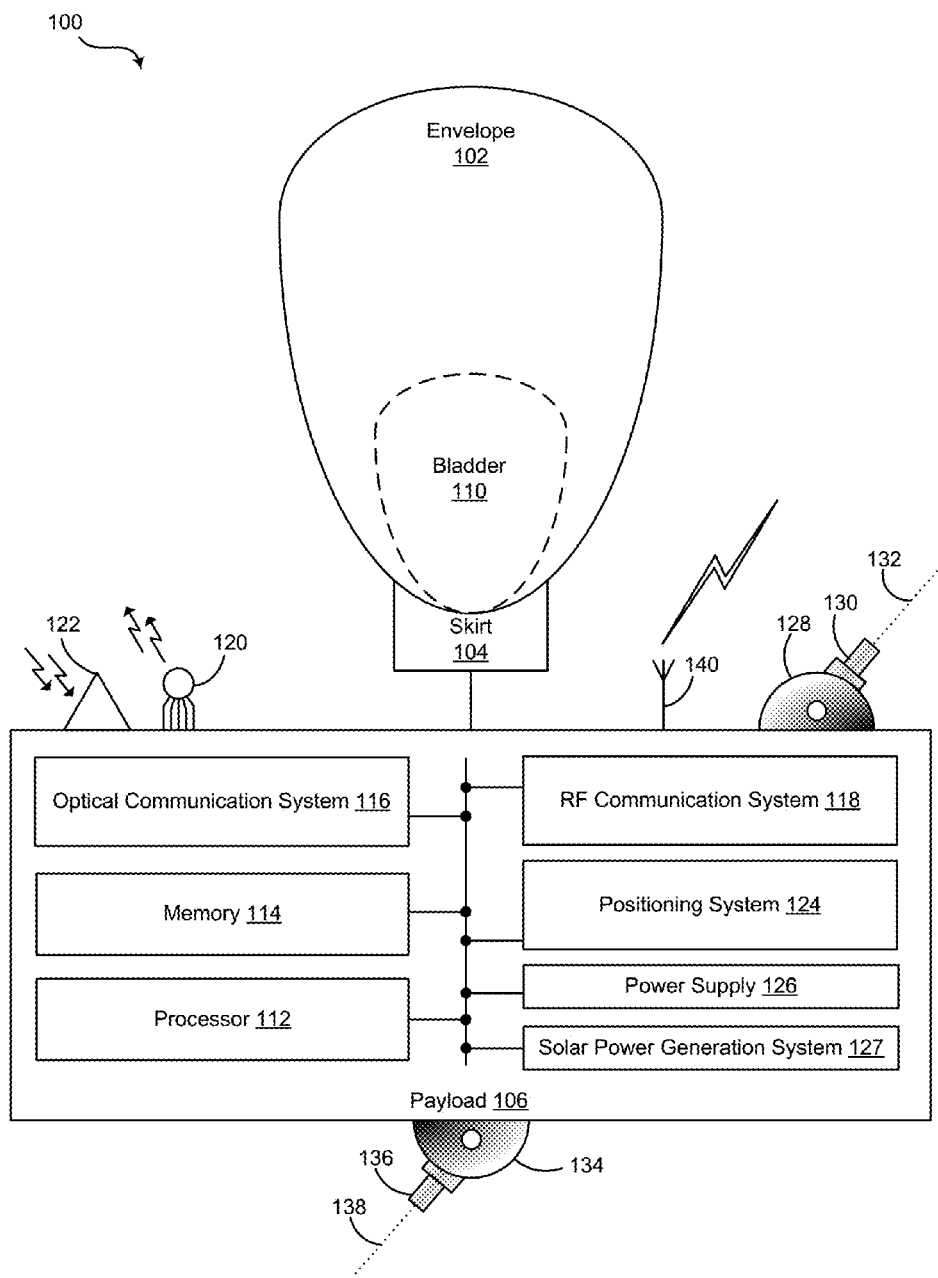
FIG. 1 illustrates a high-altitude balloon, according to an embodiment.

Illustrative embodiments can implement an optimal altitude controller for super pressure aerostatic balloon with a data network of balloons, such as, for example, a mesh network of high-altitude balloons deployed in the stratosphere. The optimal altitude controller can reconfigure the altitude of a balloon, possibly operating in a balloon network, in situations when the balloon network is needed or desired to supplement a cellular network, among other situations. The balloon network can be useful for supplementing the cellular network in various scenarios. For example, the balloon network can be a useful supplement when the cellular network has reached capacity. As another example, the balloon network can be a useful supplement when the cellular network provides insufficient coverage in a given area.

To this end, an illustrative embodiment uses a central control system that is configured to operate with the balloon network with balloons flying at various altitudes. During operation of the network, balloons may need to change altitude. However, in order to have an extended period of flight, it may be desirable to use renewable resources when adjusting the altitude of the balloon, and if possible, to use renewable resources exclusively. Embodiments also include the central control system changing the altitudes of various balloons in a coordinated effort to form a balloon network, as disclosed herein.

Traditional balloons may add or vent lift gas (e.g., helium) in order to change altitude. However, when the helium supply is gone, the balloon may not be able to increase altitude. Thus, the method of optimally controlling altitude presented herein uses ambient air so that there is not a finite supply for each balloon flight. Further, the method of optimally controlling altitude may also include adding or removing air using only a renewable power source, such as solar power.

In one example embodiment, a balloon features solar charging units configured to receive sunlight and convert it to energy. This energy can be both stored in batteries and used to power components of the balloon. The balloon also includes a control unit configured to selectively add or remove air from the inside of the balloon. Air that is added comes from the environment in which the balloon is located. Further, the control unit is powered by the energy stored in the batteries and provided by the solar charging units. Thus, the balloon may be able to add or remove gas from the balloon without depleting a gas source and by only using power that can be renewed via sunlight.

Disclosed herein are methods and apparatuses configured to control the altitude of a balloon that may form a portion of a communication network. However, this disclosure is not limited to a network of balloons and similar methods and apparatuses. The disclosed methods and apparatuses may also function with a single balloon, a high-altitude platform, or other variable-buoyancy vehicles, such as submarines.

II. Balloon Configuration

FIG. 1 illustrates a high-altitude balloon 100, according to an embodiment. The balloon 100 includes an envelope 102, a skirt 104, and a payload 106.

The envelope 102 and the skirt 104 can take various forms, which can be currently well-known or yet to be developed. For instance, the envelope 102, the skirt 104, or both can be made of metalized Mylar® or BoPET (biaxially-oriented polyethylene terephthalate). Some or all of the envelope 102, the skirt 104, or both can be constructed from a highly-flexible latex material or a rubber material, such as, for example, chloroprene. These examples are illustrative only; other materials can be used as well. Further, the shape and size of the envelope 102 and the skirt 104 can vary depending upon the particular implementation. Additionally, the envelope 102 can be filled with various different types of gases, such as, for example, helium, hydrogen, or both. These examples are illustrative only; other types of gases can be used as well.

The payload 106 of the balloon 100 includes a processor 112 and memory 114. The memory 114 can be or include a non-transitory computer-readable medium. The non-transitory computer-readable medium can have instructions stored thereon, which can be accessed and executed by the processor 112 in order to carry out some or all of the functions provided in this disclosure.

The payload 106 of the balloon 100 can also include various other types of equipment and systems to provide a number of different functions. For example, the payload 106 includes an optical communication system 116. The optical communication system 116 can transmit optical signals by way of an ultra-bright LED system 120. In addition, the optical communication system 116 can receive optical signals by way of an optical-communication receiver, such as, for example, a photo-diode receiver system. Further, the payload 106 can include an RF communication system 118. The RF communication system 118 can transmit and/or receive RF communications by way of an antenna system 140.

In addition, the payload 106 includes a power supply 126. The power supply 126 can be used to provide power to the various components of the balloon 100. The power supply 126 can be or include a rechargeable battery. In some implementations, the power supply 126 can represent another suitable power supply known in the art for producing power. In addition, the balloon 100 includes a solar power generation system 127. The solar power generation system 127 can include solar panels, which can be used to generate power for charging the power supply 126 or for distribution by the power supply 126. In some embodiments, it may be desirable for the balloon system to run off sustainable power. Therefore, all energy used by the balloon system from power supply 126 may be provided from a renewable source, such as solar power generation system 127.

Further, the payload 106 includes various types of sensors 128. The payload 106 can include sensors such as, for example, video or still cameras, a GPS system, motion sensors, accelerometers, gyroscopes, compasses, or sensors for capturing environmental data. These examples are illustrative only; the payload 106 can include various other types of sensors. Further, some or all of the components in the payload 106 can be implemented in a radiosonde, which can be operable to measure various types of information, such as, for example, pressure, altitude, geographical position (latitude and longitude), temperature, relative humidity, wind speed, or direction, among other information.

As noted above, the payload 106 includes an ultra-bright LED system 120. In some implementations, the ultra-bright LED system 120 can be used for free-space optical communication with other balloons. In some implementations, the ultra-bright LED system 120 can be used for free-space optical communication with satellites. In some implementations, the ultra-bright LED system 120 can be used for free-space optical communication both with other balloons and with satellites. To this end, the optical communication system 116 can be configured to transmit a free-space optical signal by causing modulations in the ultra-bright LED system 120. The manner in which the optical communication system 116 is implemented can vary, depending upon the particular application.

In addition, the balloon 100 can be configured for altitude control. For instance, the balloon 100 can include a variable buoyancy system. The buoyancy system can be configured to change the altitude of the balloon 100 by adjusting the volume, the density, or both of the gas in the envelope 102 of the balloon 100. A variable buoyancy system can take various forms, and can generally be any system that can change the volume and/or density of gas in the envelope 102 of the balloon 100.

In an embodiment, a variable buoyancy system can include a bladder 110 that is located inside of the envelope 102. The bladder 110 can be an elastic chamber that is configured to hold liquid and/or gas. Alternatively, the bladder 110 need not be inside the envelope 102. For instance, the bladder 110 can be a rigid bladder that can be pressurized well beyond neutral pressure. The buoyancy of the balloon 100 can therefore be adjusted by changing the density and/or volume of the gas in the bladder 110. To change the density in the bladder 110, the balloon 100 can be configured with systems and/or mechanisms for heating and/or cooling the gas in the bladder 110. Further, to change the volume, the balloon 100 can include pumps or other features for adding gas to and/or removing gas from the bladder 110. To change the volume of the bladder 110, the balloon 100 can include release valves or other features that are controllable to allow gas to escape from the bladder 110. Multiple bladders 110 can be implemented within the scope of this disclosure. For instance, multiple bladders can be used to improve balloon stability.

In an embodiment, the envelope 102 can be filled with helium, hydrogen, or other material that is lighter than air. Thus, the envelope 102 can have an associated upward buoyancy force. In this embodiment, air in the bladder 110 can be considered a ballast tank that can have an associated downward ballast force. In another embodiment, the amount of air in the bladder 110 can be changed by pumping air (for example, with an air compressor) into and out of the bladder 110. By adjusting the amount of air in the bladder 110, the ballast force can be controlled. In some embodiments, the ballast force can be used, in part, to counteract the buoyancy force and/or to provide altitude stability.

In some embodiments, the envelope 102 can be substantially rigid and include an enclosed volume. Air can be evacuated from the envelope 102 while the enclosed volume is substantially maintained. In other words, at least a partial vacuum can be created and maintained within the enclosed volume. Thus, the envelope 102 and the enclosed volume can become lighter than air and provide a buoyancy force. In some embodiments, air or another material can be controllably introduced into the partial vacuum of the enclosed volume by a control unit in an effort to adjust the overall buoyancy force and/or to provide altitude control. Further, the envelope 102 may be coupled to a mass-changing unit, configured to function as the control unit. The mass-changing unit may be configured with an impeller configured to add or remove air from within the envelope 102. Additionally, the mass-changing unit may also include a vent configured to add or remove air from the envelope 102. A more detailed description of the altitude control system is described with respect to FIG. 5 herein.

In an embodiment, a portion of the envelope 102 can be a first color (for example, black) and/or a first material that is different from another portion or the remainder of the envelope 102. The other portion or the remainder of the envelope can have a second color (for example, white) and/or a second material. For instance, the first color and/or first material can be configured to absorb a relatively larger amount of solar energy than the second color and/or second material. Thus, rotating the balloon such that the first material is facing the sun can act to heat the envelope 102 as well as the gas inside the envelope 102. In this way, the buoyancy force of the envelope 102 can increase. By rotating the balloon such that the second material is facing the sun, the temperature of gas inside the envelope 102 can decrease. Accordingly, the buoyancy force can decrease. In this manner, the buoyancy force of the balloon can be adjusted by changing the temperature/volume of gas inside the envelope 102 using solar energy. In this embodiment, a bladder need not be an element of the balloon 100. Thus, in this embodiment, altitude control of the balloon 100 can be achieved, at least in part, by adjusting the rotation of the balloon 100 with respect to the sun.

Further, the payload 106 of the balloon 100 can include a navigation system (not shown in FIG. 1). The navigation system can implement station-keeping functions to maintain position within and/or move to a position in accordance with a desired topology. In particular, the navigation system can use altitudinal wind data to determine altitudinal adjustments that result in the wind carrying the balloon in a desired direction and/or to a desired location. The altitude-control system can then make adjustments to the density of the balloon chamber in order to effectuate the determined altitudinal adjustments and cause the balloon to move laterally to the desired direction and/or to the desired location.

Alternatively, the altitudinal adjustments can be computed by a ground-based control system and communicated to the high-altitude balloon. As another alternative, the altitudinal adjustments can be computed by a ground-based or satellite-based control system and communicated to the high-altitude balloon. Furthermore, in some embodiments, specific balloons in a heterogeneous balloon network can be configured to compute altitudinal adjustments for other balloons and transmit the adjustment commands to those other balloons.

In such an arrangement, the navigation system can be operable to navigate the balloon to a landing location, in the event the balloon needs to be removed from the network and/or accessed on the ground. Further, a balloon can be self-sustaining so that it does not need to be accessed on the ground. In some embodiments, a balloon can be serviced in-flight by one or more service balloons or by another type of service aerostat or service aircraft.

III. Balloon Networks

Figure 2:
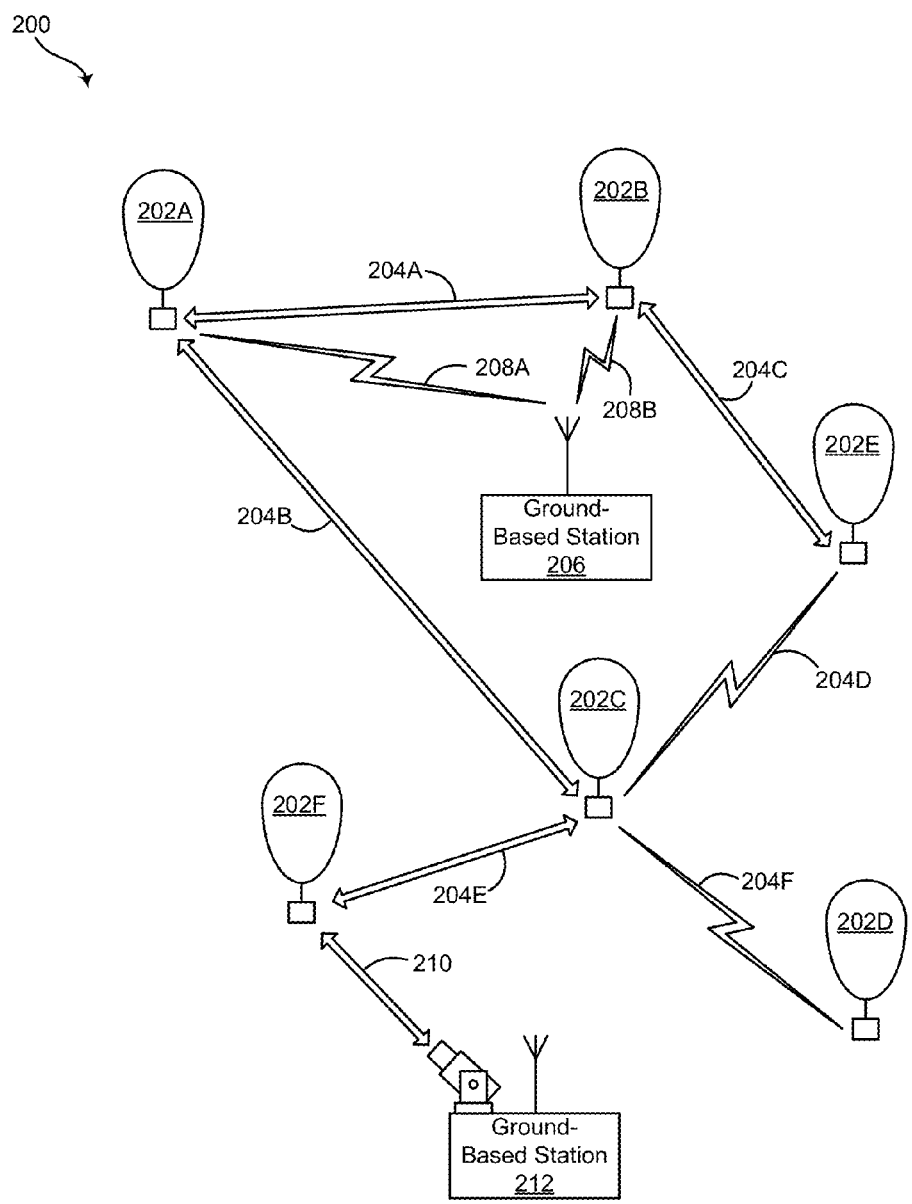
FIG. 2 illustrates a balloon network, according to an embodiment.

FIG. 2 illustrates a balloon network 200, according to an embodiment. The balloon network 200 includes balloons 202A-202F. The balloons 202A-202F are configured to communicate with one another by way of free-space optical links 204A-204F. Configured as such, the balloons 202A to 202F can collectively function as a mesh network for packet-data communications. Further, at least some of the balloons 202A-202F, such as, for example, the balloons 202A and 202B, can be configured for RF communications with a ground-based station 206 by way of respective RF links 208A and 208B. The ground-based station 206 represents one or more ground-based stations. In addition, some of the balloons 202A-202F, such as, for example, the balloon 202F, can be configured to communicate by way of an optical link 210 with a ground-based station 212. The ground-based station 212 represents one or more ground-based stations.

In an embodiment, the balloons 202A-202F are high-altitude balloons, which can be deployed in the stratosphere. At moderate latitudes, the stratosphere includes altitudes between approximately 10 kilometers (km) and 50 km above the Earth's surface. At the poles, the stratosphere starts at an altitude of approximately 8 km. In an embodiment, high-altitude balloons can be configured to operate in an altitude range within the stratosphere that has relatively low wind-speeds, such as, for example, between 5 and 20 miles per hour (mph).

In the high-altitude-balloon network 200, the balloons 202A-202F can be configured to operate at altitudes between 18 km and 25 km. In some implementations, the balloons 202A-202F can be configured to operate at other altitudes. The altitude range of 18 km-25 km can be advantageous for several reasons. In particular, this layer of the stratosphere generally has relatively low wind speeds (for example, winds between 5 and 20 mph) and relatively little turbulence. Further, while the winds in this altitude range can vary with latitude and by season, the variations can be modeled in a reasonably accurate manner. In addition, altitudes above 18 km are typically above the maximum flight level designated for commercial air traffic. Therefore, interference with commercial flights is not a significant concern when balloons are deployed between 18 km and 25 km.

To transmit data to another balloon, a given balloon 202A-202F can be configured to transmit an optical signal by way of a corresponding optical link 204A-204F. In an embodiment, some or all of the balloons 202A-202F can use one or more high-power light-emitting diodes (LEDs) to transmit an optical signal. Alternatively, some or all of the balloons 202A-202F can include laser systems for free-space optical communications over corresponding optical links 204A-204F. Other types of free-space optical communication are possible. Further, in order to receive an optical signal from another balloon by way of an optical link, a given balloon 202A-202F can include one or more optical receivers, as discussed above in connection with FIG. 1.

The balloons 202A-202F can utilize one or more of various different RF air-interface protocols for communication with ground-based stations, such as, for example, the ground-based station 206. For instance, some or all of the balloons 202A-202F can be configured to communicate with the ground-based station 206 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

There can be scenarios where the RF links 208A-208B do not provide a desired link capacity for balloon-ground communications. For instance, increased capacity can be desirable to provide backhaul links from a ground-based gateway. Accordingly, a balloon network can also include downlink balloons, which can provide a high-capacity air-ground link.

For example, in the balloon network 200, the balloon 202F is configured as a downlink balloon. Like other balloons in the balloon network 200, the downlink balloon 202F can be operable for optical communication with other balloons by way of corresponding optical links 204A-204F. The downlink balloon 202F can also be configured for free-space optical communication with the ground-based station 212 by way of the optical link 210. The optical link 210 can therefore serve as a high-capacity link (as compared to the RF links 208A-208B) between the balloon network 200 and the ground-based station 212.

Note that in some implementations, the downlink balloon 202F can be operable for RF communication with the ground-based stations 206. In other implementations, the downlink balloon 202F may only use the optical link 210 for balloon-to-ground communications. Further, while the arrangement shown in FIG. 2 includes one downlink balloon 202F, a balloon network can also include multiple downlink balloons. In addition, a balloon network can be implemented without the use of any downlink balloons.

In some implementations, a downlink balloon can be equipped with a specialized, high-bandwidth RF communication system for balloon-to-ground communications, instead of, or in addition to, a free-space optical communication system. The high-bandwidth RF communication system can take the form of an ultra-wideband system, which can provide an RF link with substantially the same capacity as one of the optical links 204A-204F.

Ground-based stations, such as the ground-based stations 206 and 212, can take various forms. Generally, a ground-based station includes components such as transceivers, transmitters, and receivers for communication with a balloon network by way of RF links, optical links, or both. Further, a ground-based station can use various air-interface protocols in order to communicate with one or more of the balloons 202A-202F by way of an RF link. As such, a ground-based station 206 can be configured as an access point by which various devices can connect to the balloon network 200. The ground-based station 206 can have other configurations and can serve other purposes without departing from the scope of this disclosure.

Some or all of the balloons 202A-202F can be configured to establish a communication link with space-based satellites by way of corresponding communication links. The balloons can establish the communication links with the space-based satellites in addition to, or as an alternative to, the ground-based communication links. In addition, the balloons can be configured to communicate with the space-based satellites using any suitable protocol. In some implementations, one or more of the communication links can be optical links. Accordingly, one or more of the balloons can communicate with the satellites by way of free-space optical communication. Other balloon-satellite communication links and techniques can be used.

Further, some ground-based stations, such as, for example, the ground-based station 206, can be configured as gateways between the balloon network 200 and another network. For example, the ground-based station 206 can serve as an interface between the balloon network 200 and the Internet, a cellular service provider's network, or another network.

A. Mesh-Network Functionality

As noted above, the balloons 202A-202F can collectively function as a mesh network. More specifically, because the balloons 202A-202F can communicate with one another using free-space optical links, the balloons can collectively function as a free-space optical mesh network.

In a mesh-network configuration, each of the balloons 202A-202F can function as a node of the mesh network. The mesh network can be operable to receive data directed to it and to route data to other balloons. As such, data can be routed from a source balloon to a destination balloon by determining an appropriate sequence of optical links between the source balloon and the destination balloon. This disclosure may refer to these optical links, collectively, as a "lightpath" for the connection between the source and destination balloons. Further, this disclosure may refer to each of the optical links as a "hop" along the lightpath.

To operate as a mesh network, the balloons 202A-202F can employ various routing techniques and self-healing algorithms. In some implementations, the balloon network 200 can employ adaptive or dynamic routing, in which a lightpath between a source balloon and a destination balloon is determined and set-up when the connection is needed, and is released at a later time. Further, when adaptive routing is used, the lightpath can be determined dynamically, depending upon the current state, past state, and/or predicted state of the balloon network.

In addition, the network topology can change as the balloons 202A-202F move relative to one another and/or relative to the ground. Accordingly, the balloon network 200 can apply a mesh protocol to update the state of the network as the topology of the network changes. For example, to address the mobility of the balloons 202A-202F, the balloon network 200 can employ and/or adapt various techniques that are employed in mobile ad hoc networks (MANETs).

In some implementations, the balloon network 200 can be configured as a transparent mesh network. In a transparent balloon network, the balloons can include components for physical switching in a way that is entirely optical, without involving a substantial number of, or any, electrical components in the physical routing of optical signals. Accordingly, in a transparent configuration with optical switching, signals can travel through a multi-hop lightpath that is entirely optical.

In other implementations, the balloon network 200 can implement a free-space optical mesh network that is opaque. In an opaque configuration, some or all of the balloons 202A-202F can implement optical-electrical-optical (OEO) switching. For example, some or all of the balloons 202A-202F can include optical cross-connects (OXCs) for OEO conversion of optical signals. This example is illustrative only; other opaque configurations can be used.

The balloons 202A-202F in the balloon network 200 can utilize techniques such as wavelength division multiplexing (WDM) in order to increase link capacity. When WDM is implemented with transparent switching, physical lightpaths through the balloon network can be subject to the wavelength continuity constraint. In particular, because switching in a transparent network is entirely optical, it can be necessary, in some instances, to assign the same wavelength to all optical links along a given lightpath.

An opaque configuration can be used to avoid the wavelength continuity constraint. In particular, balloons in an opaque balloon network can include OEO switching systems operable for wavelength conversion. As a result, balloons can convert the wavelength of an optical signal at corresponding hops along a lightpath.

Further, various routing algorithms can be employed in an opaque configuration. For example, to determine a primary lightpath and/or one or more diverse backup lightpaths for a given connection, a balloon can apply shortest-path routing techniques, such as, for example, Dijkstra's algorithm and k-shortest path. In addition, a balloon can apply edge and node-diverse or disjoint routing, such as, for example, Suurballe's algorithm. Further, a technique for maintaining a particular quality of service (QoS) can be employed when determining a lightpath.

B. Station-Keeping Functionality

In an embodiment, a balloon network 100 can implement station-keeping functions to help provide a desired network topology. For example, station-keeping can involve each of the balloons 202A-202F maintaining a position or moving to a position relative to one or more other balloons in the network 200. The station-keeping can also, or instead, involve each of the balloons 202A-202F maintaining a position or moving to a position relative to the ground. Each of the balloons 202A-202F can implement station-keeping functions to determine the given balloon's desired positioning in the desired topology, and if desirable, to determine how the given balloon is to move to the desired position.

The network topology can vary depending on the desired implementation. In an implementation, the balloons 202A-202F can implement station-keeping such that the balloon network 200 has a substantially uniform topology. For example, a given balloon can implement station-keeping functions to position itself at substantially the same distance (or within a certain range of distances) from adjacent balloons in the balloon network. In another implementation, the balloons 202A-202F can implement station-keeping such that the balloon network 200 has a substantially non-uniform topology. This implementation can be useful when there is a need for balloons to be distributed more densely in some areas than in others. For example, to help meet higher bandwidth demands that are typical in urban areas, balloons can be clustered more densely over urban areas than in other areas. For similar reasons, the distribution of balloons can be denser over land than over large bodies of water. These examples are illustrative only; non-uniform topologies can be used in other settings.

In addition, the topology of a balloon network can be adaptable. In particular, balloons can utilize station-keeping functionality to allow the balloons to adjust their respective positioning in accordance with a change in the topology of the network. For example, several balloons can move to new positions in order to change a balloon density in a given area.

In an implementation, the balloon network 200 can employ an energy function to determine whether balloons should move in order to provide a desired topology. In addition, the energy function can indicate how the balloons should move in order to provide the desired topology. In particular, a state of a given balloon and states of some or all nearby balloons can be used as inputs to an energy function. The energy function can apply the states to a desired network state, which can be a state corresponding to the desired topology. A vector indicating a desired movement of the given balloon can then be determined by determining a gradient of the energy function. The given balloon can then determine appropriate actions to take in order to effectuate the desired movement. For example, a balloon can determine an altitude adjustment or adjustments such that winds will move the balloon in the desired manner.

C. Control of Balloons in a Balloon Network

Figure 3:
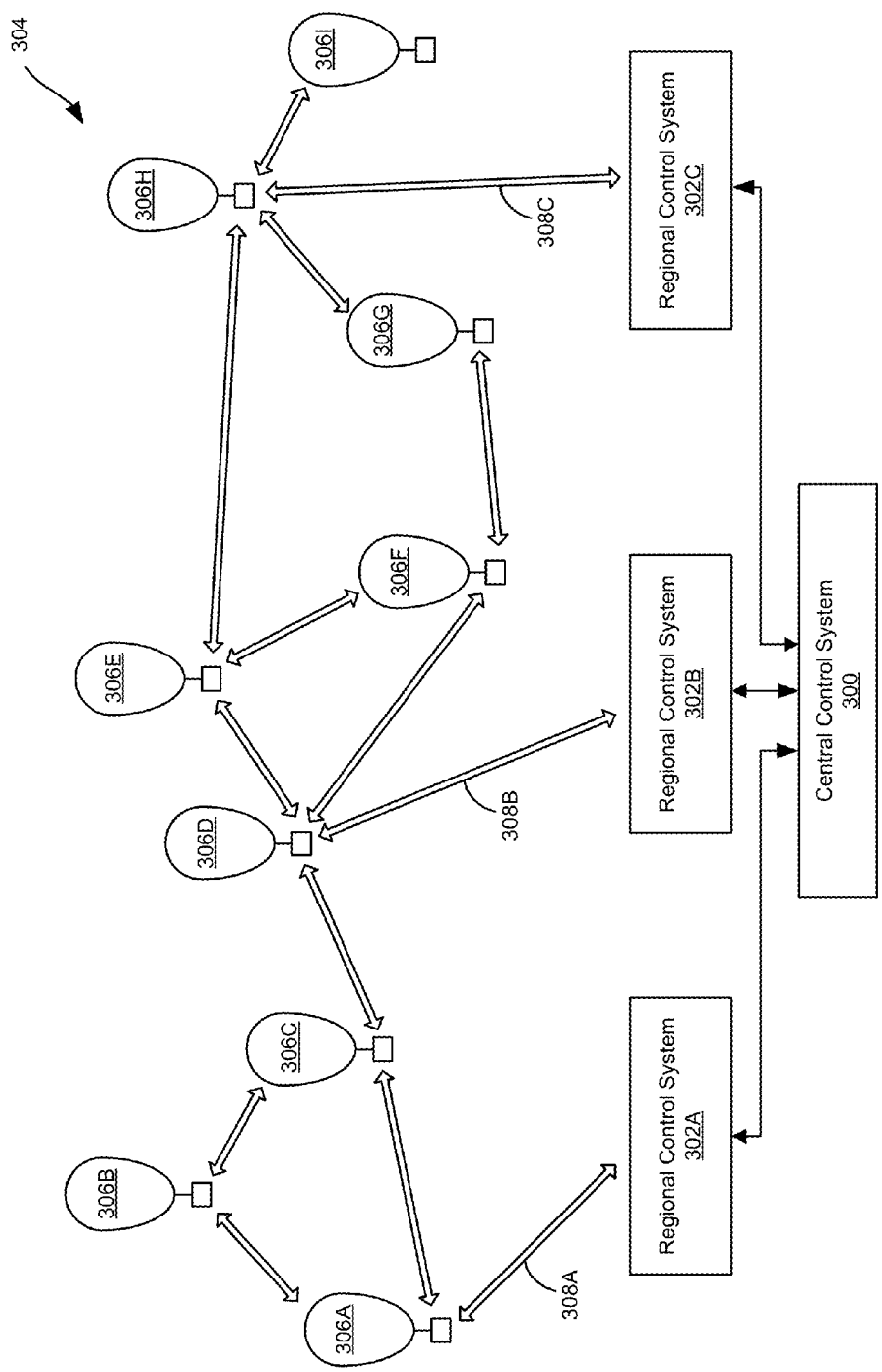
FIG. 3 illustrates a centralized system for controlling a balloon network, according to an embodiment.

Mesh networking, station-keeping functions, or both can be centralized. For example, FIG. 3 illustrates a centralized system for controlling a balloon network 304. In particular, a central control system 300 is in communication with regional control-systems 302A-302C. The central control system 300 can be configured to coordinate functionality of the balloon network 304. To this end, the central control system 300 can control functions of balloons 306A to 306I.

The central control system 300 can communicate with the balloons 306A-306I by way of the regional control systems 302A-302C. Each of the regional control systems 302A-302C can be a ground-based station, such as, for example, the ground-based station 206 discussed above in connection with FIG. 2. Each of the regional control systems 302A-302C can cover a different geographic area. The geographic areas can overlap or be separate. Each of the regional control systems 302A-302C can receive communications from balloons in the respective regional control system's area. In addition, each of the regional control systems 302A-302C can aggregate data from balloons in the respective regional control system's area. The regional control systems 302A-302C can send information they receive to the central control system 300. Further, the regional control systems 302A-302C can route communications from the central control system 300 to the balloons 306A-306I in their respective geographic areas. For instance, the regional control system 302A can relay communications between the balloons 306A-306C and the central control system 300. Likewise, the regional control system 302B can relay communications between the balloons 306D-306F and the central control system 300. Likewise, the regional control system 302C can relay communications between the balloons 306G-306I and the central control system 300.

To facilitate communications between the central control system 300 and the balloons 306A-306I, some of the balloons 306A-306I can serve as downlink balloons. The downlink balloons can communicate with the regional control systems 302A-302C. Accordingly, each of the regional control systems 302A-302C can communicate with a downlink balloon in the geographic area that the regional control system covers. In the balloon network 304, the balloons 306A, 306D, and 306H serve as downlink balloons. The regional control system 302A can communicate with the downlink balloon 306A by way of communication link 308A. Likewise, the regional control system 302B can communicate with the downlink balloon 306D by way of communication link 308B. Likewise, the regional control system 302C can communicate with the balloon 306H by way of communication link 308C. The communication links 308A-308C can be optical links or RF links, depending on the desired implementation.

In the balloon network 304, three of the balloons serve as downlink balloons. In an implementation, all of the balloons in a balloon network can serve as downlink balloons. In another implementation, fewer than three balloons or more than three balloons in a balloon network can serve as downlink balloons.

The central control system 300 can coordinate mesh-networking functions of the balloon network 304. For example, the balloons 306A-306I can send the central control system 300 state information. The central control system 300 can utilize the state information to determine the state of the balloon network 304. State information from a given balloon can include data such as, for example, location data identifying the relative or absolute location of the balloon. In addition, the state information from the given balloon can include data representing wind speeds near the balloon. In addition, the state information from the given balloon can include information about an optical link that the balloon has established. For example, the information about the optical link can include the identity of other balloons with which the balloon has established an optical link, the bandwidth of the optical link, wavelength usage, or availability on an optical link. Accordingly, the central control system 300 can aggregate state information from some or all of the balloons 306A-306I in order to determine an overall state of the balloon network 304.

The overall state of the balloon network 304 can be used to coordinate mesh-networking functions, such as, for example, determining lightpaths for connections. For example, the central control system 300 can determine a current topology based on the aggregate state information from some or all of the balloons 306A-306I. The topology can indicate which optical links are available in the balloon network 304. In addition, the topology can indicate which wavelengths are available for use with the links. The central control system 300 can send the topology to some or all of the balloons 306A-306I so that a routing technique can be employed to select appropriate lightpaths (and possibly backup lightpaths) for communications that use the balloon network 304.

In addition, the central control system 300 can coordinate station-keeping functions of the balloon network 304. For example, the central control system 300 can receive state information from the balloons 306A-306I, as discussed above, and can use the state information as an input to an energy function. The energy function can compare the current topology of the network to a desired topology and, based on the comparison, provide a vector indicating a direction of movement (if any) of each balloon. Further, the central control system 300 can use altitudinal wind data to determine respective altitude adjustments that can be initiated in order to achieve the movement towards the desired topology.

Accordingly, the arrangement shown in FIG. 3 provides for coordinating communications between the central control system 300 and the balloon network 304. This arrangement can be useful to provide centralized control for a balloon network that covers a large geographic area. When expanded, this arrangement can support a global balloon network, which can provide global coverage.

This disclosure contemplates arrangements other than the arrangement shown in FIG. 3. For example, an arrangement can include a centralized control system, regional control systems, and sub-region systems. The sub-region systems can serve to provide communications between the centralized control system and the corresponding regional control systems. As another example, control functions of a balloon network can be provided by a single, centralized, control system. The control system can communicate directly with one or more downlink balloons.

The central control system 300 and the regional control systems 302A-302C need not control and coordinate all of the functions of the balloon network 304. In an implementation, a ground-based control system and a balloon network can share control and coordination of the balloon network. In another implementation, the balloon network itself can control and coordinate all of the functions of the balloon network. Accordingly, in this implementation, the balloon network can be controlled without a need for ground-based control. To this end, certain balloons can be configured to provide the same or similar functions as those discussed above in connection with the central control system 300 and the regional control systems 302A-302C.

In addition, control of a balloon network, coordination of the balloon network, or both can be de-centralized. For example, each balloon in a balloon network can exchange state information with nearby balloons. When the balloons exchange state information in this way, each balloon can individually determine the state of the network. As another example, certain balloons in a balloon network can serve as aggregator balloons. The aggregator balloons can aggregate state information for a given portion of the balloon network. The aggregator balloons can coordinate with one another to determine the overall state of the network.

Control of a balloon network can be localized in a way that the control does not depend on the overall state of the network. For example, balloons in a balloon network can implement station-keeping functions that only consider nearby balloons. In particular, each balloon can implement an energy function that takes into account the balloon's own state and the states of nearby balloons. The energy function can be used to maintain the balloon at a desired position or to move the balloon to a desired position in relation to nearby balloons, without considering the desired topology of the balloon network as a whole. When each balloon in the balloon network implements an energy function in this way, the balloon network as a whole can maintain a desired topology or move towards a desired topology.

For example, assume that a given balloon $B_0$ receives distance information $d_1, d_2, d_3, \ldots, d_k$. The distance information $d_1$ represents the distance from the balloon $B_0$ to its neighboring balloon $B_1$. Likewise, the distance information $d_2$ represents a distance from the balloon $B_0$ to its neighboring balloon $B_2$, the distance $d_3$ represents a distance from the balloon $B_0$ to its neighboring balloon $B_3$, and the distance $d_k$ represents a distance from the balloon $B_0$ to its neighboring balloon $B_k$. Accordingly, the distance information represents distances from the balloon to its k closest neighbors. The balloon $B_0$ can treat the distance to each of the k balloons as a virtual spring with vector representing a force direction from the first nearest neighbor balloon i toward balloon $B_0$ and with force magnitude proportional to $d_1$. The balloon $B_0$ can sum each of the k vectors to obtain a summed vector that represents desired movement of the balloon $B_0$. The balloon $B_0$ can attempt to achieve the desired movement by controlling its altitude, as discussed above. This is but one technique for assigning force magnitudes; this disclosure contemplates that other techniques can also be used.

D. Balloon Network with Optical and RF Links between Balloons

Figure 4:
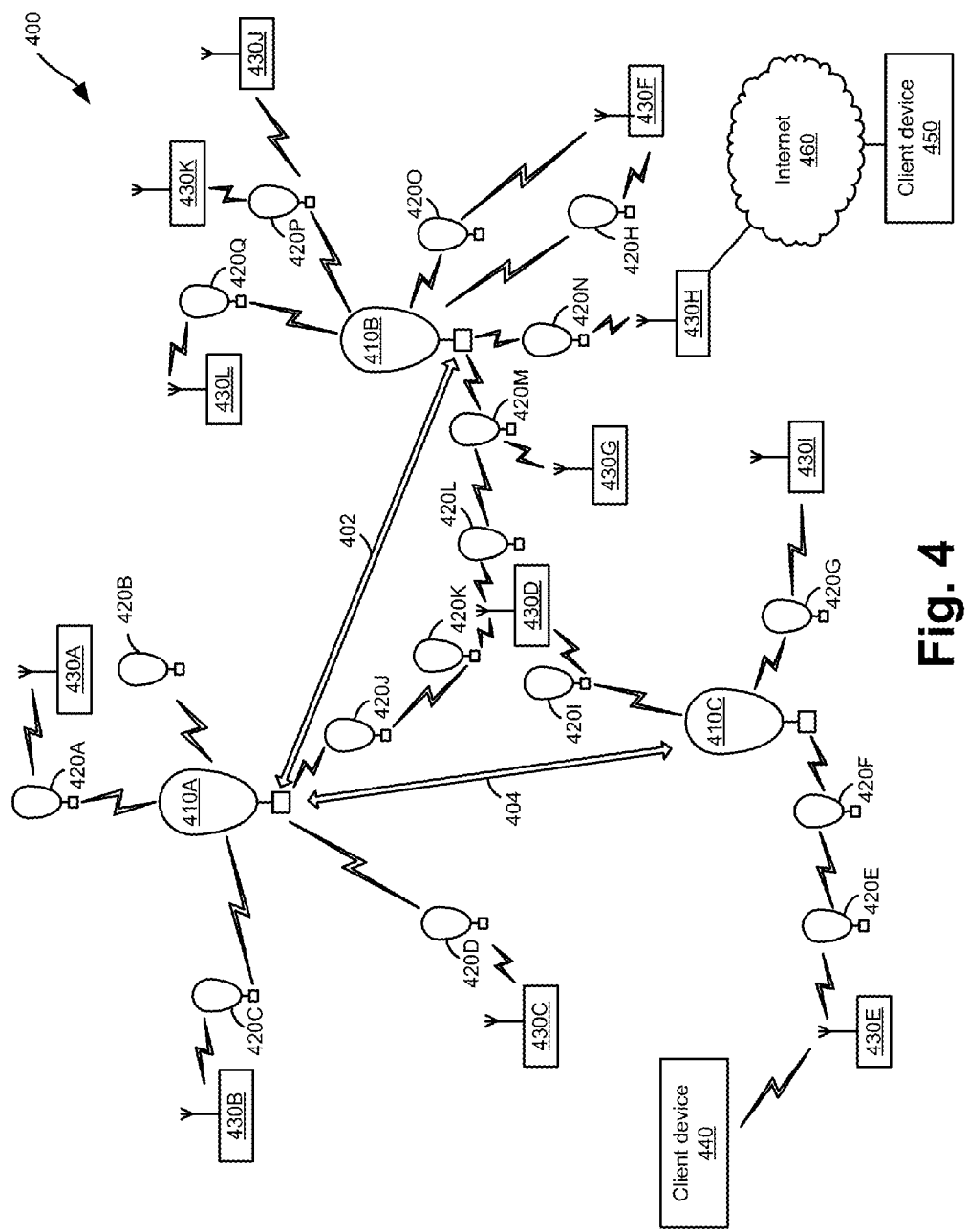
FIG. 4 illustrates a balloon network that includes super-nodes and sub-nodes, according to an embodiment.

A balloon network can include super-node balloons (or simply "super nodes") and sub-node balloons (or simply "sub-nodes"). The super-nodes can communicate with one another by way of optical links. The sub-nodes can communicate with super-nodes by way of RF links. FIG. 4 illustrates a balloon network 400 that includes super-nodes 410A-410C and sub-nodes 420A-420Q, according to an embodiment.

Each of the super-nodes 410A-410C can be provided with a free-space optical communication system that is operable for packet-data communication with other super-node balloons. Accordingly, super-nodes can communicate with one another by way of optical links. For example, the super-node 410A and the super-node 410B can communicate with one another by way of an optical link 402. Likewise, the super-node 410A and the super-node 410C can communicate by way of an optical link 404.

Each of the sub-nodes 420A-420Q can be provided with a radio-frequency (RF) communication system that is operable for packet-data communication over an RF air interface. In addition, some or all of the super-nodes 410A-410C can include an RF communication system that is operable to route packet data to one or more of the sub-nodes 420A-420Q. For example, when the sub-node 420A receives data from the super-node 410A by way of an RF link, the sub-node 420A can use its RF communication system to transmit the received data to a ground-based station 430A by way of an RF link.

In an embodiment, all of the sub-node balloons 420A-420Q can be configured to establish RF links with ground-based stations. For example, all of the sub-nodes 420A-420Q can be configured similarly to the sub-node 420A, which is operable to relay communications between the super-node 410A and the ground-based station 430A by way of respective RF links.

In an embodiment, some or all of the sub-nodes 420A-420Q can be configured to establish RF links with other sub-nodes. For example, the sub-node 420F is operable to relay communications between the super-node 410C and the sub-node 420E. In this embodiment, two or more sub-nodes can provide a multi-hop path between a super-node and a ground-based station. For example, a multi-hop path is provided between the super-node 410C and the ground-based station 430E by way of the sub-node balloons 420E and 420F.

Note that an RF link can be a directional link between a given entity and one or more other entities, or an RF link can be part of an omni-directional broadcast. In the case of an RF broadcast, one or more "links" can be provided by way of a single broadcast. For example, the super-node 410A can establish a separate RF link with each of the sub-nodes 420A-420C. Instead, the super-node 410A can broadcast a single RF signal that can be received by the sub-nodes 420A, 420B, and 420C. The single RF broadcast can in effect provide all of the RF links between the super-node balloon 410A and the sub-node balloons 420A-420C.

Some or all of the super-nodes 410A-410C can serve as downlink balloons. In addition, the balloon network 420 can be implemented without the use of any of the sub-nodes 420A-420Q. In addition, in an embodiment, the super-nodes 410A-410C can collectively function as a core network (or, in other words, as a backbone network), while the sub-nodes 420A-420Q can function as access networks to the core network. In this embodiment, some or all of the sub-nodes 420A-420Q can function as gateways to the balloon network 400. Note that some or all of the ground-based stations 430A-430L can also, or instead, function as gateways to the balloon network 400.

The network topology of the balloon network 400 is but one of many possible network topologies. Further, the network topology of the balloon network 400 can vary dynamically, as super-nodes and sub-nodes move relative to the ground, relative to one another, or both.

Figure 5:
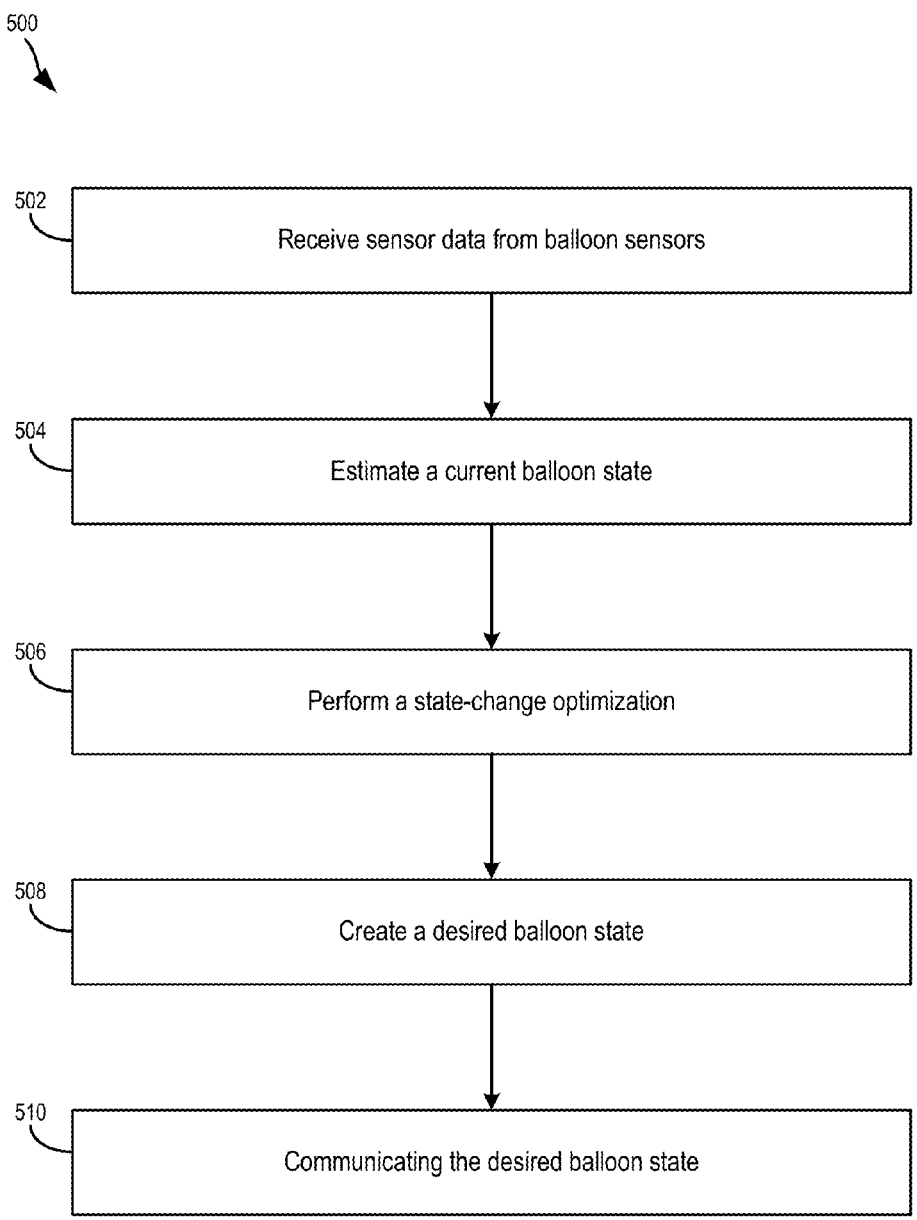
FIG. 5 illustrates a method for the optimal altitude control for a super pressure aerostatic balloon.

IV. Methods for the Optimal Altitude Control for a Super Pressure Aerostatic Balloon FIG. 5 illustrates a method for the optimal altitude control for a super pressure aerostatic balloon. In particular, method 500 can be used with the balloon systems previously discussed with respect to FIGS. 1-4, such as the balloon network 400 discussed above in connection with FIG. 4. In some embodiments, method 500 may be performed at least in part by the previously discussed centralized control system. However, the balloon itself may perform some (or all) of method 500. The balloon system may alter the location of where various elements of method 500 are performed based on various criteria. For example, if a communication link between the balloon and the centralized control system is lost, the balloon may perform more function. However, in other embodiments, a majority (or all) of method 500 may be performed by the centralized control system to reduce power usage by the balloon. By reducing power usage, the balloon flight may use renewable power, allowing for an extended balloon flight time.

At block 502, the method 500 receives sensor data from the balloon sensors, such as sensors 128. Sensor data may either be (i) provided from the sensors to a processor or (ii) read from the sensor by the processor (e.g. sensors may either be actively providing data or they may passive sensors that must be read). The sensors may provide information such as an ambient pressure and balloon velocity. The ambient pressure sensor measures the air pressure in the environment surrounding the balloon. The velocity sensor provides data indicative of the velocity of the balloon. In some embodiments, the velocity sensors may provide velocity with respect to each axis in the three-axis coordinate system (e.g. an X-, Y-, and Z-velocity).

Further, the sensors also provide location data. The location data provides information relating to the location of the balloon. The location data may be used to locate the balloon at a specific position on the Earth (i.e. a global location). However, in other embodiments, the location data may be data indicative of a relative position. For example, a balloon may not know its exact global location, but it knows its location with respect to another object (or balloon). Thus, the location data from the sensors may be a relative location.

In various embodiments, the sensor data may be received (or measured) either continuously or periodically. Further, the sensor data may be received either continuously or periodically based on a current state of the balloon. For example, if a balloon is configured to hold a specific altitude, sensor data may be configured to be received periodically. In one embodiment, sensor data is received every 5 minutes. However, when the balloon is changing altitude, sensor data may be configured to be received continuously. Alternatively, when the balloon is changing altitude, sensor data may be configured to be received with a shorter period than when the balloon is holding a specific altitude. For example, sensor data may be received every 30 seconds while the balloon is changing altitude. The amount of time stated above for each example is merely one example, other times may be used in each situation as well.

In some embodiments, sensor data is first received by a processor on the balloon and responsively transmitted wirelessly for further processing. Before being transmitted for further processing, the sensor data may be compressed for ease of transmission. The sensor data may be transmitted to the centralized control system, as previously discussed. In another embodiment, the sensor data may be transmitted to a networked processing server, or other computing device for further processing.

At block 504, the method 500 includes estimating a current balloon state. A processor within the centralized control system estimates a current balloon state based on the received sensor data. The balloon state includes the current altitude and vertical velocity of the balloon. Further, the balloon state may also include the global location of the balloon as well. Moreover, in some embodiments, the balloon state also includes the horizontal velocity. However, the horizontal velocity may be omitted from the balloon state in various embodiments. Thus, the balloon state may be considered to have a 1-dimension motion for two states (e.g. position and speed along a vertical line, perpendicular to the surface of the Earth) and a specific location.

When the centralized control system receives the sensor data, it will process the data to determine the balloon state. For example, the output of the pressure sensor may be used to calculate the altitude of the balloon. Additionally, a GPS sensor may provide location data that can be used to help determine the balloon state. Further, the output of the velocity sensors may be used to determine the velocity component of the balloon state. The centralized control system will compile the data from the various sensors to determine the balloon state.

In some alternate embodiments, a processor that is mounted on the balloon system estimates the balloon state. The processor may estimate the balloon state and transmit the balloon state information for further processing. Thus, in this embodiment the balloon is configured to communicate processed state information from the sensors, rather than the sensor data. The processor on the balloon may calculate an estimated balloon state in the same way as the centralized control system estimates the balloon state. However, in other embodiments, the processor on the balloon may use less computationally intensive algorithms to calculate the balloon state. By using less computationally intensive algorithms, the processor on the balloon may use less power. The less computationally intensive algorithm may either result in a less accurate state estimate (as compared to the centralized control system estimate) or it may result in the calculation being performed more slowly.

Additionally, block 504 may include either determining or receiving a desired final balloon state. Typically, the final balloon state includes a new altitude for the balloon and zero vertical movement (e.g. a state-change for the balloon involves changing the steady-state balloon altitude).

The final balloon state may be determined based on a variety of factors. For example, in some areas there may be restrictions on the altitude at which a balloon can fly. When the balloon approaches this area, a final balloon state is determined to ensure the balloon is flying within an appropriate designated altitude. In another embodiment, the balloon may have a radio link with other balloons, a ground base station, or a satellite. A final balloon state may be determined in order to adjust a radio link. In yet other embodiments, the final balloon state may be determined based on external factors, such as weather or other criteria.

How exactly the final balloon state is determined is not critical to the present application At Block 506, the method 500 performs a state change optimization. The state change optimization produces a linear time invariant state-space model of a super-pressure balloon in order to find out predictive optimal-control policies for target altitude points of the balloon. Additionally, the state change optimization determines a control policy for the balloon that both (i) obeys the laws of physics and (ii) avoids actions (and states) that are undesirable. In summary, the optimization is a convex optimization problem that returns the best control policy given a model for the balloon's movement and a set of constraints. For example, the constraints may specify altitude thresholds that the balloon should never cross. In another example, the constraints may specify the balloon should change altitude in the most power-efficient manner. In yet another example, the constraints may specify that the balloon should minimize the amount of time to change altitudes. In still another example, the constraints specify a damping factor that dictates the balloon's movement.

The constraints may be set based on a variety of factors. For example, the balloon may default to operate in a mode to minimize power usage. However, in some instances, it may be desirable to have more precise control of the balloon's movement. In one example of needing more precise control, a balloon may be entering airspace that has restrictions on the altitude at which it can fly. Constraints may be set to make sure the balloon adjusts it altitude both (i) quickly enough to avoid undesirable air space and (ii) in a manner to avoid either over- or under-shooting the target altitude. The constraints may vary depending on the specific movement the balloon is performing. The central control system may either be programmed with specific constraints or may contain logic configured to determine the constraints for the balloon movement.

In another embodiment, failure modes may be avoided altogether through the inclusion of constraints that rule out portions of that state space known to cause failures. For example, one could require that the altitude never exceed a predetermined number of kilometers, if we know that the vehicle will fail above that predetermined number of kilometers. Further, embodiments may include constraints related to efficient use of the balloon's energy reserves, because the balloon has to generate and store all energy on board. Storage (e.g. batteries) in particular is very expensive (both in terms of weight and financial cost). For example, there will be significant portions of each day when the balloon cannot generate much or any energy to replenish the reserves (e.g. at night). In these instances, the constraints may cause the balloon to increase or decrease altitude as efficiently as possible. In some embodiments, the central control system may indicate the balloon does not have the energy required for the requested state change; thus, a new state change (or no change at all) may be requested.

In order to perform the optimization, a state space model of the balloon is created. The state space model has 3 state variables: (i) the mass of the balloon; (ii) the vertical position of the balloon; and (iii) the vertical speed of the balloon. The only variable that can directly be controlled is the mass of the balloon. Both the vertical position and the vertical speed of the balloon are a function of the balloon's mass. The optimization functions as a single-input single-output (SISO) system. The input to the system is a filling rate of the balloon; thus, the optimization determines a fill-rate plan for the balloon. The output controlled by the filling rate is the altitude of the balloon. Additionally, the filling rate both (i) determines the balloon's mass and (ii) is controlled with a mass-changing unit. The mass-changing unit is configured to either add or remove air from the envelope of the balloon to increase or decrease the balloon's mass. Air may be added to the balloon with an impeller in the mass-changing unit. Air may be removed from the balloon either with the impeller or a vent in the mass-changing unit.

To perform the optimization, a model of the system is created. In the model, there are three main forces acting on the balloon: Lift ($F_l$), Weight ($F_w$), and Drag ($F_d$). Each of the forces may be calculated individually. For lift ($F_l$), the optimization assumes that the balloon stays in the stratosphere (11000 to 25000 meters), so then from the Earth's atmosphere model we have:

Temperature: $T=-56.46C=216.69K$

Pressure: $P=22.65*e^{1.73-0.000157h}$ (where $h$ is altitude)

From the Equation of gas: $PV=nRT$ $$\frac{n}{V} = \frac{P}{RT} = \rho_{air}$$

$$\rho_{air} = \frac{22.65 * e^{1.73-.000157h}}{RT}$$

Taking the formula for air density, given by $\rho_{air}$ above, and multiplying by V (the volume of air in the balloon and gravity (g), gives the lift force on the balloon.

$$F_l = V \frac{22.65 * e^{1.73-.000157h}}{RT} g$$

The calculation of the weight force ($F_w$) is just mass times gravity.

$$F_w = -mg$$

One way to model the drag force ($F_d$) uses a linear model (which is typically good for low speeds, such as the balloon). In the equation, b is a drag coefficient for the balloon and $\dot{z}$ is the vertical velocity of the balloon.

$$F_d = -b\dot{z}$$

Using Newton's law, a differential equation can be defined. Force equals mass times acceleration ($\ddot{z}$); thus, the sum of all forces on the balloon, equals the mass of the balloon times the acceleration of the balloon.

$$\Sigma F = m\ddot{z}$$

The three forces acting on the balloon can be substituted in the above equation for the summation. Additionally, by dividing out the mass, the equation can be solved in terms of acceleration.

$$m\ddot{z} = V \frac{22.65 * e^{1.73-.000157h}}{RT} g - b\dot{z} - mg$$

$$\ddot{z} = V\frac{22.65 * e^{1.73-.000157h}}{mRT}g - \frac{b\dot{z}}{m} - g$$

The optimization uses a state vector (x) that defines altitude (z), vertical velocity (ż), and mass (m). An initial state vector ($x_0$) may be defined by the initial conditions for the three variables, as shown in the equation below.

$$x = \begin{bmatrix} z \\ \dot{z} \\ m \end{bmatrix}$$

Further, the instantaneous change in the state vector can include the input of the mass-changing unit ($C_H$). Thus, the instantaneous change in the non-linear state equation, including the input (u) becomes the following equation. The input (u) may be positive (indicating air was added with an impeller of the mass-changing unit) or negative (indicating air was removed with either an impeller or a vent of the mass-changing unit). Further, the input (u) may represent the sum of ($u_{impeller}$) and ($u_{vent}$), which respectively represent mass added or removed by the impeller or removed with the vent. Additionally, the instantaneous change in the state vector is defined by ẋ. The equation ẋ linearizes the vector z around the point $x_0$. The linearization includes $F(x_0)$ which is the derivative of z with respect to time, and $DF(x_0)$ which is the Jacobian of $F(x)$ taken at $x_0$.

$$\begin{bmatrix} \dot{z} \\ \ddot{z} \\ \dot{m} \end{bmatrix} = \begin{bmatrix} V\frac{22.65 * e^{1.73-.000157h}}{mRT}g - \frac{b\dot{z}}{m} - g \\ 0 \end{bmatrix} + \begin{bmatrix} 0 \\ 0 \\ C_H \end{bmatrix} u$$

$$\dot{x} = F(x_0) + DF(x_0)(x-x_0)$$

The equations can be rewritten in a space state form. The space state form is a mathematical model of a system having a state as a function of time x(t), an input as a function of time u(t), a change in state as a function of time ẋ(t), and an output as a function of time y(t). There are four variable matrices; each relates either the input or the state to either the change in state or the output. The A matrix relates the current state to the current change in state, the B matrix relates the input to the change in state. The C matrix relates the current state to the output and the D matrix relates the input directly to the output (i.e. pass through). The following equations define a generic state space set of differential equations.

$$\dot{x}(t) = Ax(t) + Bu(t)$$

$$y(t) = Cx(t) + Du(t)$$

In one example, the initial criteria for a balloon may include an initial height of 20 kilometers, no initial vertical speed, and a mass of 88.086. Therefore, the initial state vector is:

$$x_0 = \begin{bmatrix} 20000 \\ 0 \\ 88.086 \end{bmatrix}$$

Based on the initial values for a system (given above), an A matrix can be solved for by substituting the initial values into the linearized equation above. The above example, results in the following A matrix.

$$A = \begin{bmatrix} 0 & 1 & 0 \\ -9*10^{-4} & -2.3*10^{-3} & -6.8*10^{-3} \\ 0 & 0 & 0 \end{bmatrix}$$

For the balloon system, the only input is a change in mass. Therefore, the B matrix is:

$$B = \begin{bmatrix} 0 \\ 0 \\ 1 \end{bmatrix}$$

Additionally, the only output that is measured is altitude. Therefore, the C matrix is:

$$C = \begin{bmatrix} 1 \\ 0 \\ 0 \end{bmatrix}$$

Further, the balloon system does not feature any pass through, so the D matrix is equal to 0.

$$D = 0$$

In order to have a convex problem (i.e. a set of equations that will converge to one solution), the linear equations must be discretized. The discretization explains how the state changes along a discrete time axis for a zero-hold input. Thus, the discretization equation pair is as follows.

$$x[k+1] = A_d x[k] + B_d u[k]$$

$$y[k] = C_d x[k] + D_d u[k]$$

The following are the four discretization matrices as the they relate to the matrices of the non-discretized form. In the equations below, $T_s$ is a period of time.

$$A_d = e^{AT_s}$$

$$B_d = (\int_{\tau=}^{T_s} e^{A\tau} d\tau)B$$

$$C_d = C$$

$$D_d = D$$

The following property of the exponential matrix may be used to solve for the above matrices. In the equation below, I represents the identity matrix.

$$e^{\begin{bmatrix} A & B \\ 0 & 0 \end{bmatrix} T_s} = \begin{bmatrix} M_{11} & M_{12} \\ 0 & I \end{bmatrix}$$

where:
$A_d = M_{11}$
$B_d = M_{12}$

Based on the above sets of equations, the values for the state of the balloon can be calculated for each step of 'k' (i.e. for each incremental period of time). Thus, the optimization will define a plurality of positions that the balloon may traverse as it adjusts from the initial state to the final state. In some embodiments, each position of the balloon defined by a step 'k' may be an individual balloon state. Thus, by progressing the balloon along each step of 'k', the balloon will move from an initial state to the final state. When the set of equations are solved, the optimization can include various constraints. Additionally, the optimization may be run once when a state-change is required or it may be run at various intervals as a the balloon is changing state.

The discretized form of the equations allows the system to be defined by an explicit set of variables. For example, the altitude, the vertical velocity, the mass, and the mass-changing control signal are each defined for each step of a plurality of time steps. The mass-changing control signal specifies how the mass-changing should either add or remove mass from the balloon. Mass may be added or removed with either the impeller or a vent. Generally, mass will be added with the impeller and removed with either the impeller or the vent. However, in some instances, the balloon may have a lower internal air pressure than the surrounding air and mass may be added with the vent and removed with the impeller.

The discretized equations give the physical constraints for $z$, $\dot{z}$, and m at time T depend on z, $\dot{z}$, and m at time T−1. From here, if the input (u) is constrained to take specific values for all times T, the result is essentially a simulator: every variable is fully constrained, and the sequence of z values is the simulated altitude trajectory the balloon will take.

Alternatively, the system can include mission constraints. In one embodiment, u=1 represents full throttle on the impeller, and a the system includes a constraint of 0≤u[T] ≤1.0 for all times T. Because this constraint indicates that u[T] will always be greater than or equal to 0 in this specific embodiment, this embodiment represents when only the impeller is in operation and gas will not be vented. An altitude constraint may be included specifying that the balloon cannot go above CEILING meters, by adding constraints z[T]≤CEILING for all T. Further, a constraint may specify a minimum altitude of FLOOR meters that the balloon must stay above after a given time $T_A$. Thus, the constraint may be written as z[T]≥FLOOR for all T≥$T_A$. An additional constraint, $EXT_{\dot{z}}$, may specify a maximum speed that the balloon may not exceed while ascending or descending. Therefore, a constraint may specify −$EXT_{\dot{z}}$≤z[T]≤$EXT_{\dot{z}}$ for all times T. Another constraint, EPS, may specify a threshold altitude range. The balloon may be constrained to stay within EPS meters of a target altitude TARGET after time $T_T$ by adding constraints TARGET−EPS≤z[T]≤TARGET+EPS for all T≥$T_T$.

In yet another constraint configuration, a battery-modeling function is included with the constraints. The battery-modeling function models battery usage as a variable, with constraints that the battery must always be between 0 and MAXBATT. The function accounts for the battery depletion overnight (as the battery may be charged by sunlight). The function also accounts for the battery recharging during the day. The function also models the impeller usage depleting the battery faster than when the impeller is not in use. In one example, this method could be used to achieve a specific altitude at a specific time tomorrow, doing whatever is necessary to make sure to use solar power efficiently (relative to battery storage capacity). The function may also ensure that the balloon has enough power to survive the night, etc. The battery-modeling function may be used alongside other constraints.

The above set of variables and constraints can be combined with an objective function to form a linear program for the balloon. Thus, states can be determined based on the output of a linear program solver or convex optimization solver. In one example, a computing system would return to you the optimal values for all the variables, respecting both the physical constraints and the mission constraints. The values are called "the optimal values" because, in addition to all the constraints, an objective function may also be specified. The objective function may be a quantity to be minimized or maximized. For example, the objective function may conserve energy by minimizing the total amount of throttle provided to the impeller; this may be achieved using an objective function such as "minimize $\text{sum}_T(u[t])$". However, because venting gas does not use energy to operate the impeller, the function "minimize $\text{sum}_T(u[t])$" may only operate on components of u[t] that represent the impeller adding air to the balloon. Supplying this objective function along with the above constraints to a convex optimization/linear programming package will cause the optimizer to compute the most energy efficient means of satisfying all the constraints provided.

In other embodiments, objective function may be set to take the minimum amount of time possible to get to altitude TARGET meters and then stay within EPS meters of that altitude. Further, constraints may be set to make sure the total power usage of the state change stays within an energy-use budget.

At Block 508, the method 500 creates at least one desired balloon state based on the state change optimization. The one or more desired balloon states may be created at the same time, or each subsequent state may be determined when the balloon achieves the previous state. In other examples, block 508 may continuously or iteratively revise the desired balloon state based on the state change optimization.

The desired balloon state may be series of balloon states that result from the optimization. In some embodiments, the desired balloon state may be a subset of the optimization from block 506. For example, the optimization may specify a group of steps that result in a smooth movement of the balloon across a long period of time (long relative to the time it take the balloon to adjust from the initial to final state). Therefore, it may not be desirable to create a desired state for the various interim positions the balloon will have as it moves. Additionally, block 508 may include some logic to determine which of the various positions calculated by the optimization should be converted into balloon states. Further, in some embodiments block 508 may simply determine a control signal. The control signal may indicate to the mass-changing unit an amount of air to add (or remove) from the balloon in order to achieve the desired state.

At Block 510, the method 500 communicates the desired balloon state to the balloon. In embodiments where blocks 506 and 508 are not performed on the balloon, the desired balloon state created at block 508 is communicated to the balloon by a wireless connection. For example, the same type of connection that is used to communicate the sensor data may be used to communicate the desired balloon state. However, in other embodiments, a processor on the balloon may have performed some or all of blocks 506 and 508. In this embodiment, block 510 communicates the balloon state information to a processor that controls the mass-changing unit. However, in both embodiments, a processor that controls the mass-changing unit receives at least one balloon state and responsively controls the mass-changing unit based on the received state. After receiving at least one balloon state, the mass-changing unit will responsively adjust the mass of the balloon to achieve the desired balloon state.

Figure 6:
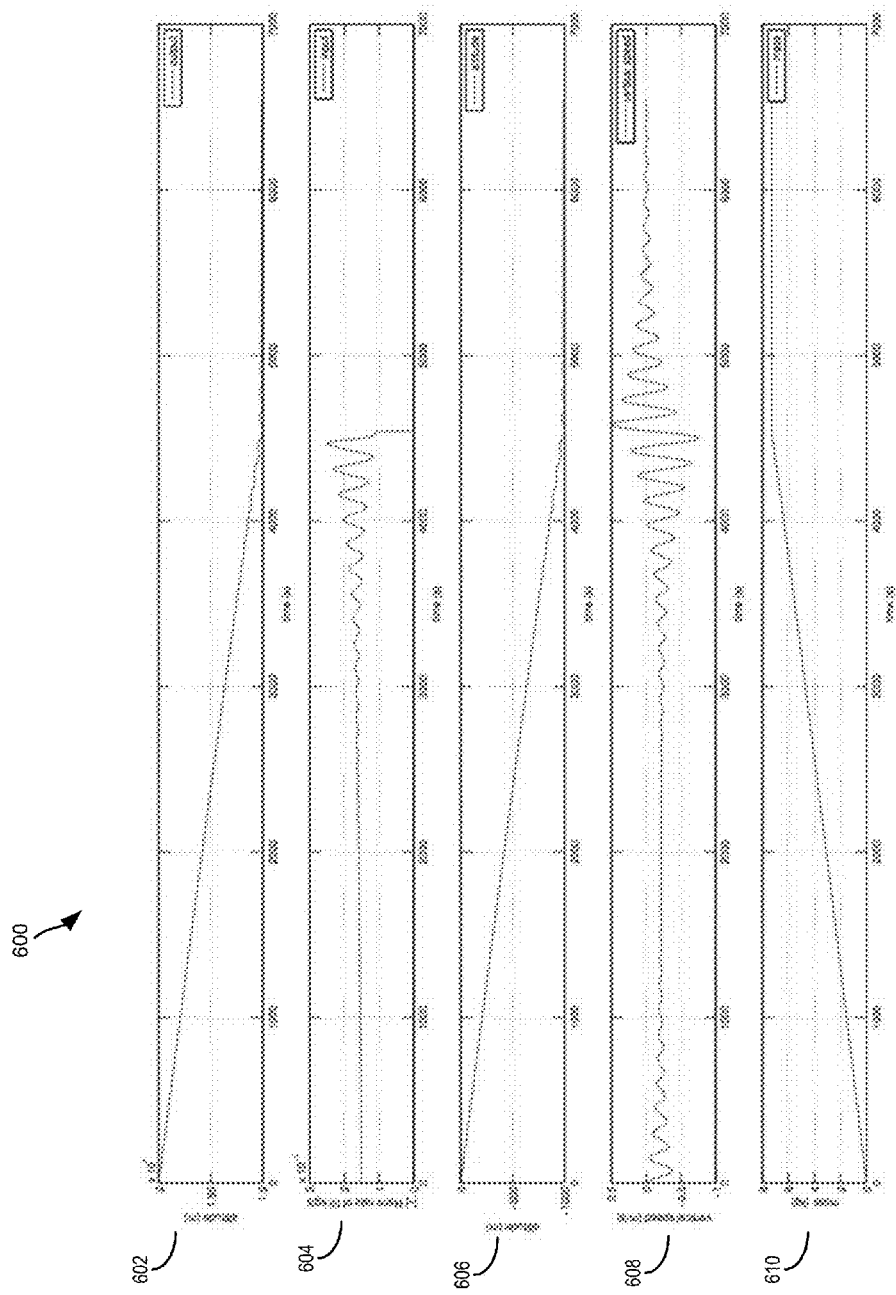
FIG. 6 illustrates an example state chart describing the motion of a balloon changing states.

FIG. 6 illustrates an example state chart 600 describing the motion of a balloon changing states. The example state chart 600 of FIG. 6 shows the motion a balloon goes through as it changes states. The output of the system is given by chart 602. In the present system, the output is the altitude of the balloon. Chart 604 shows the input to the system. Here the input is fill rate of the balloon. Chart 604 shows there was a relatively constant rate of air being added to the balloon. Around time equals 2500 seconds, the input fills rate began to oscillate. When the time is equal to about 4500 seconds, the balloon fill rate goes to zero.

Chart 606 is another chart of the altitude of the balloon (and is the same as chart 602). In some instances (not discussed herein) a system may have an output that is not direct the same as the attitude; therefore, in those instances, it may be desirable to have an altitude chart 606 separate from the output chart 602. Chart 608 shows the vertical speed of the balloon. As seen in chart 608, the balloon's vertical speed begins to oscillate when the filling starts. The vertical speed flattens out, until the time the fill rate begins to oscillate. The vertical speed oscillates around 0 until it settles at 0. Finally, chart 610 shows the mass of the balloon. The mass only changes when air is added (or removed) from the balloon. Here, air is being added to the balloon and the mass increases accordingly. For each optimization, the balloon may move in a manner that may be plotted on a state chart similar to state chart 600.

V. Computing Device and Computer Program Product

Figure 7:
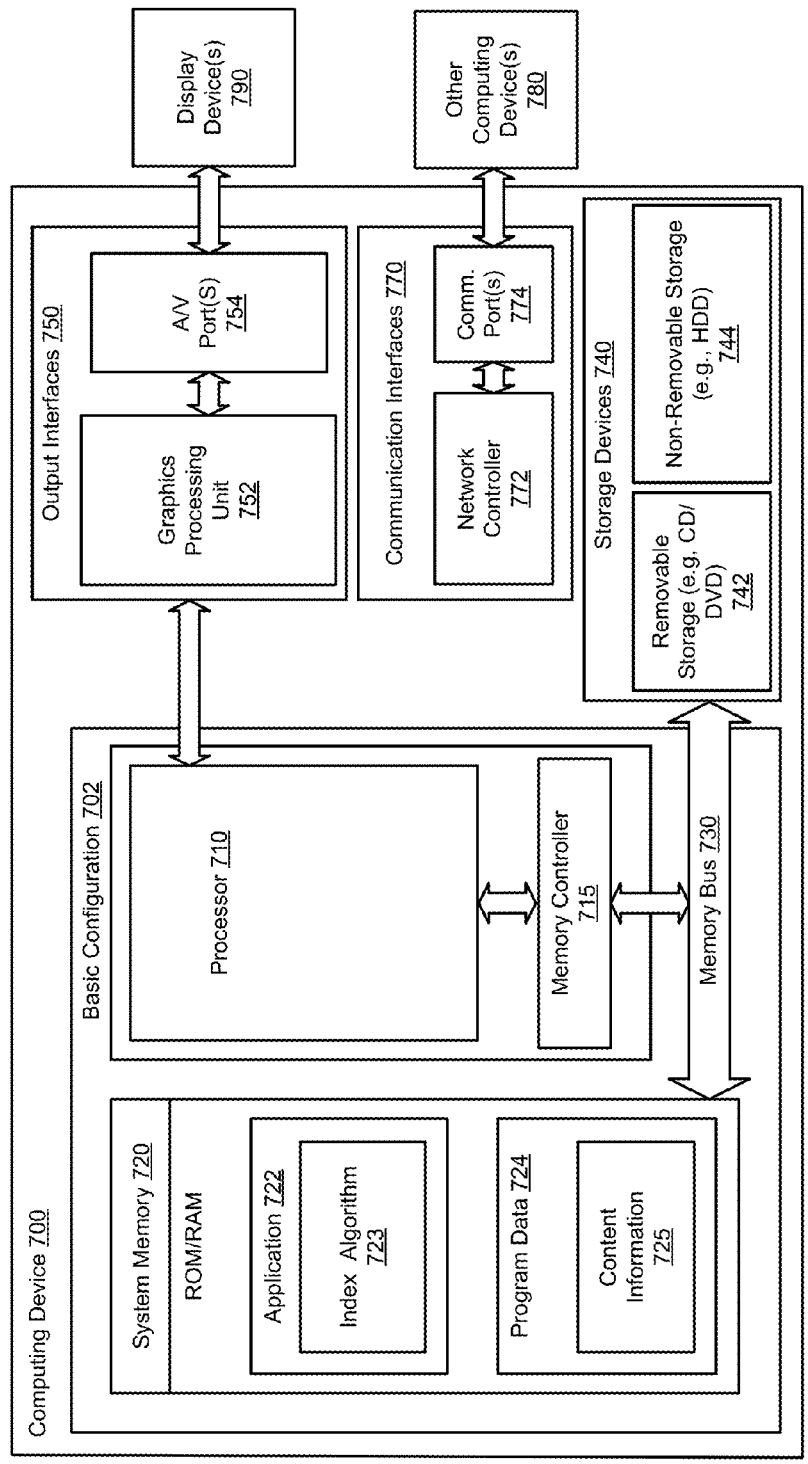
FIG. 7 illustrates a functional block diagram of a computing device, according to an embodiment.

FIG. 7 illustrates a functional block diagram of a computing device 700, according to an embodiment. The computing device 700 can be used to perform functions in connection with a reconfigurable mobile device with a balloon network. In particular, the computing device can be used to perform some or all of the functions discussed above in connection with FIGS. 1-6.

The computing device 700 can be or include various types of devices, such as, for example, a server, personal computer, mobile device, cellular phone, or tablet computer. In a basic configuration 702, the computing device 700 can include one or more processors 710 and system memory 720. A memory bus 730 can be used for communicating between the processor 710 and the system memory 720. Depending on the desired configuration, the processor 710 can be of any type, including a microprocessor (µP), a microcontroller (µC), or a digital signal processor (DSP), among others. A memory controller 715 can also be used with the processor 710, or in some implementations, the memory controller 715 can be an internal part of the processor 710.

Depending on the desired configuration, the system memory 720 can be of any type, including volatile memory (such as RAM) and non-volatile memory (such as ROM, flash memory). The system memory 720 can include one or more applications 722 and program data 724. The application(s) 722 can include an index algorithm 723 that is arranged to provide inputs to the electronic circuits. The program data 724 can include content information 725 that can be directed to any number of types of data. The application 722 can be arranged to operate with the program data 724 on an operating system.

The computing device 700 can have additional features or functionality, and additional interfaces to facilitate communication between the basic configuration 702 and any devices and interfaces. For example, data storage devices 740 can be provided including removable storage devices 742, non-removable storage devices 744, or both. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media can include volatile and nonvolatile, non-transitory, removable and non-removable media implemented in any method or technology for storage of information, such as computer readable instructions, data structures, program modules, or other data.

The system memory 720 and the storage devices 740 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 700.

The computing device 700 can also include output interfaces 750 that can include a graphics processing unit 752, which can be configured to communicate with various external devices, such as display devices 790 or speakers by way of one or more A/V ports or a communication interface 770. The communication interface 770 can include a network controller 772, which can be arranged to facilitate communication with one or more other computing devices 780 over a network communication by way of one or more communication ports 774. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR), and other wireless media.

The computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 700 can also be implemented as a personal computer including both laptop computer and non-laptop computer configurations.

Figure 8:
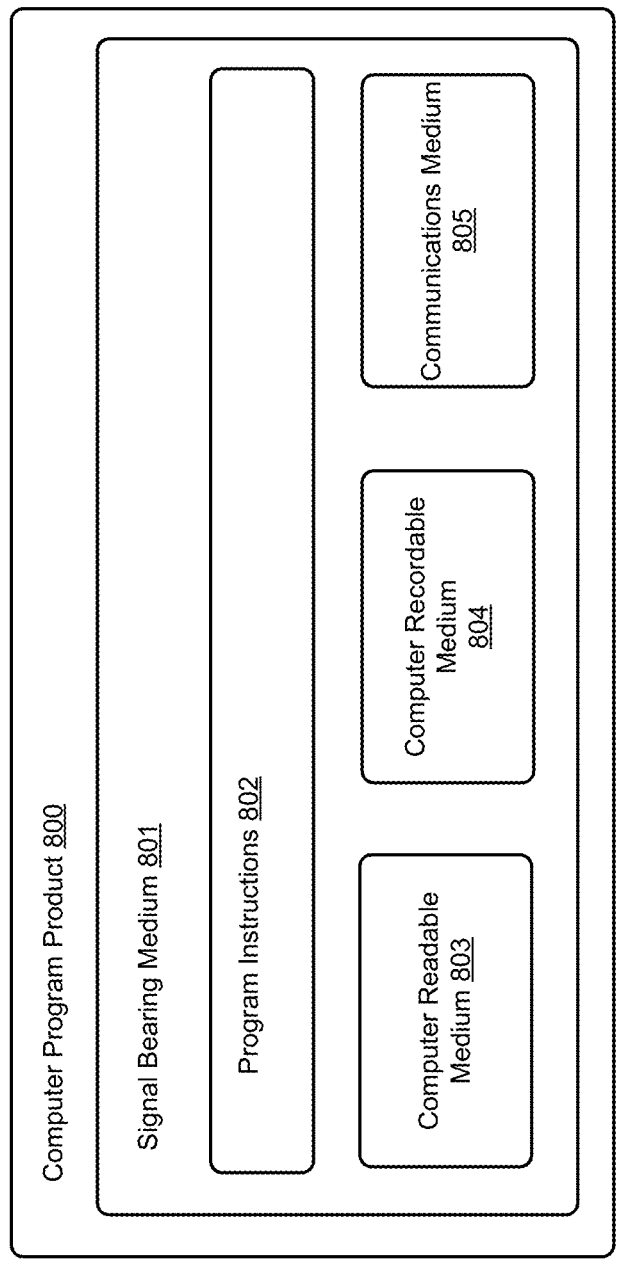
FIG. 8 illustrates a computer program product, according to an embodiment.

The disclosed methods can be implemented as computer program instructions encoded on a non-transitory computer-readable storage medium in a machine-readable format, or on other non-transitory media or articles of manufacture. FIG. 8 illustrates a computer program product 800, according to an embodiment. The computer program product 800 includes a computer program for executing a computer process on a computing device, arranged according to some disclosed implementations.

The computer program product 800 is provided using a signal bearing medium 801. The signal bearing medium 801 can include one or more programming instructions 802 that, when executed by one or more processors, can provide functionality or portions of the functionality discussed above in connection with FIGS. 1-6. In some implementations, the signal bearing medium 801 can encompass a computer-readable medium 803 such as, but not limited to, a hard disk drive, a CD, a DVD, a digital tape, or memory. In some implementations, the signal bearing medium 801 can encompass a computer-recordable medium 804 such as, but not limited to, memory, read/write (R/W) CDs, or R/W DVDs. In some implementations, the signal bearing medium 801 can encompass a communications medium 805 such as, but not limited to, a digital or analog communication medium (for example, a fiber optic cable, a waveguide, a wired communications link, or a wireless communication link). Thus, for example, the signal bearing medium 801 can be conveyed by a wireless form of the communications medium 805 (for example, a wireless communications medium conforming with the IEEE 802.11 standard or other transmission protocol).

The one or more programming instructions 802 can be, for example, computer executable instructions. A computing device (such as the computing device 700 of FIG. 7) can be configured to provide various operations in response to the programming instructions 802 conveyed to the computing device by one or more of the computer-readable medium 803, the computer recordable medium 804, and the communications medium 805.

While various examples have been disclosed, other examples will be apparent to those skilled in the art. The disclosed examples are for purposes of illustration and are not intended to be limiting, with the true scope and spirit being indicated by the following claims.

What is claimed is:

1. A method for adjusting a variable-buoyancy vehicle state comprising:
    determining at least one in-flight movement constraint for a variable-buoyancy fixed-volume vehicle, wherein the constraint is based on at least one of a mass of the vehicle, an altitude of the vehicle, a velocity of the vehicle, or an energy usage of the vehicle;
    performing a state-change optimization to determine a fill-rate control plan based on the at least one constraint to move the variable-buoyancy vehicle from a current variable-buoyancy vehicle state to a target variable-buoyancy vehicle state, wherein the fill-rate control plan comprises at least one fill rate for a bladder of the variable-buoyancy vehicle; and
    communicating the fill-rate control plan to the variable-buoyancy vehicle.

2. The method of claim 1, wherein the variable-buoyancy vehicle constraint is based on a global location.

3. The method of claim 1, wherein communicating the fill-rate control plan further comprises communicating instructions for changing the variable-buoyancy vehicle mass.

4. The method of claim 3, wherein the instructions for changing the variable-buoyancy vehicle mass comprise operating an impeller.

5. The method of claim 1, wherein the state-change optimization is performed based on a calculation including at least one of adding ambient air to or removing ambient air from the variable-buoyancy vehicle, wherein the adding ambient air to or removing ambient air adjusts the mass.

6. An aerostatic balloon comprising:
    an envelope configured to hold air;
    a bladder configured to hold lift gas, wherein the bladder is located within the envelope;
    a control unit configured to add or remove air from the envelope in order to change a mass of air in the envelope; and
    a processing unit configured to:
    determine at least one in-flight movement constraint for a variable-buoyancy fixed-volume vehicle, wherein the constraint is based on at least one of a mass of the vehicle, an altitude of the vehicle, a velocity of the vehicle, or an energy usage of the vehicle;
        perform a state-change optimization to determine a fill-rate control plan based on the at least one constraint to move the variable-buoyancy vehicle from a current variable-buoyancy vehicle state to a target variable-buoyancy vehicle state, wherein the fill-rate control plan comprises at least one fill rate for a bladder of the variable-buoyancy vehicle;
        operate the control unit based on the determined fill-rate control plan.

7. The aerostatic balloon of claim 6, further comprising a communication module configured to:
    transmit data indicative of a current balloon state to the processing unit, wherein the processing unit is located at central control system; and
    subsequently receive the fill-rate control plan that indicates at least one intermediate balloon state and a final balloon state.

8. The aerostatic balloon of claim 7, wherein the communication module is further configured to transmit and receive data wirelessly.

9. The aerostatic balloon of claim 8, wherein the communication module is further configured to transmit data relating to a current balloon state at periodic intervals.

10. The aerostatic balloon of claim 6, wherein the control unit further comprises an impeller configured to change the mass of the aerostatic balloon.

11. The aerostatic balloon of claim 6, wherein each balloon state comprises an altitude, a system mass, and a vertical velocity.

12. The aerostatic balloon of claim 11, wherein the current balloon state further comprises a global location.

13. The aerostatic balloon of claim 6, wherein the processor is configured to operate the control unit in one of a power-efficient mode, a time-efficient mode, and a damped-controlled mode.

14. An article of manufacture including a non-transitory computer-readable medium having stored thereon program instructions that, if executed by a processor in a balloon-control system, cause the balloon-control system to perform operations comprising:
    determining at least one in-flight movement constraint for a variable-buoyancy fixed-volume vehicle, wherein the constraint is based on at least one of a mass of the vehicle, an altitude of the vehicle, a velocity of the vehicle, or an energy usage of the vehicle;
    performing a state-change optimization to determine a fill-rate control plan based on the at least one constraint to move the variable-buoyancy vehicle from a current variable-buoyancy vehicle state to a target variable-buoyancy vehicle state, wherein the fill-rate control plan comprises at least one fill rate for a bladder of the variable-buoyancy vehicle; and
    communicating the fill-rate control plan to the variable-buoyancy vehicle.

15. The article of manufacture of claim 14, wherein the variable-buoyancy vehicle constraint is based on a global location.

16. The article of manufacture of claim 14, wherein communicating the fill-rate control plan further comprises communicating instructions for changing the variable-buoyancy vehicle mass.

17. The article of manufacture of claim 16, wherein the instructions for changing the variable-buoyancy vehicle mass comprise instructions for operating an impeller.

18. The article of manufacture of claim 14, wherein the communicating is performed wirelessly.

19. The article of manufacture of claim 14, wherein the state-change optimization is performed based on a calculation including at least one of adding ambient air to or removing ambient air from the variable-buoyancy vehicle, wherein the adding ambient air to or removing ambient air adjusts the mass.

20. The article of manufacture of claim 14, further comprising:
- transmitting data indicative of a current balloon state to the processing unit, wherein the processing unit is located at central control system; and
- subsequently receiving the fill-rate control plan that indicates at least one intermediate balloon state and a final balloon state.

* * * * *